F. SLATHAR.
BEET HARVESTER.
APPLICATION FILED MAR. 15, 1919.

1,378,427.

Patented May 17, 1921.
3 SHEETS—SHEET 3.

Inventor
FRITZ SLATHAR
by his attorneys
Milo B. Stevens & Co.

UNITED STATES PATENT OFFICE.

FRITZ SLATHAR, OF EAU CLAIRE, WISCONSIN.

BEET-HARVESTER.

1,378,427.

Specification of Letters Patent.  Patented May 17, 1921.

Application filed March 18, 1919. Serial No. 283,286.

*To all whom it may concern:*

Be it known that I, FRITZ SLATHAR, a citizen of the United States, residing at Eau Claire, in the county of Eau Claire and State of Wisconsin, have invented new and useful Improvements in Beet-Harvesters, of which the following is a specification.

This invention relates to machines employed for harvesting beets and similar crops, and its object is to provide a novel and improved machine of this kind which is highly efficient in operation.

The invention also has for its object to provide a machine which removes the tops from the plants prior to the digging operation, both operations being continuous, but the digging mechanism operating on a row of plants which was topped on a previous trip of the machine along that particular row.

Other objects and advantages of the invention will be pointed out in the detailed description appearing hereinafter, and in order that the same may be better understood, reference is had to the accompanying drawings forming a part of this specification.

Figure 1:
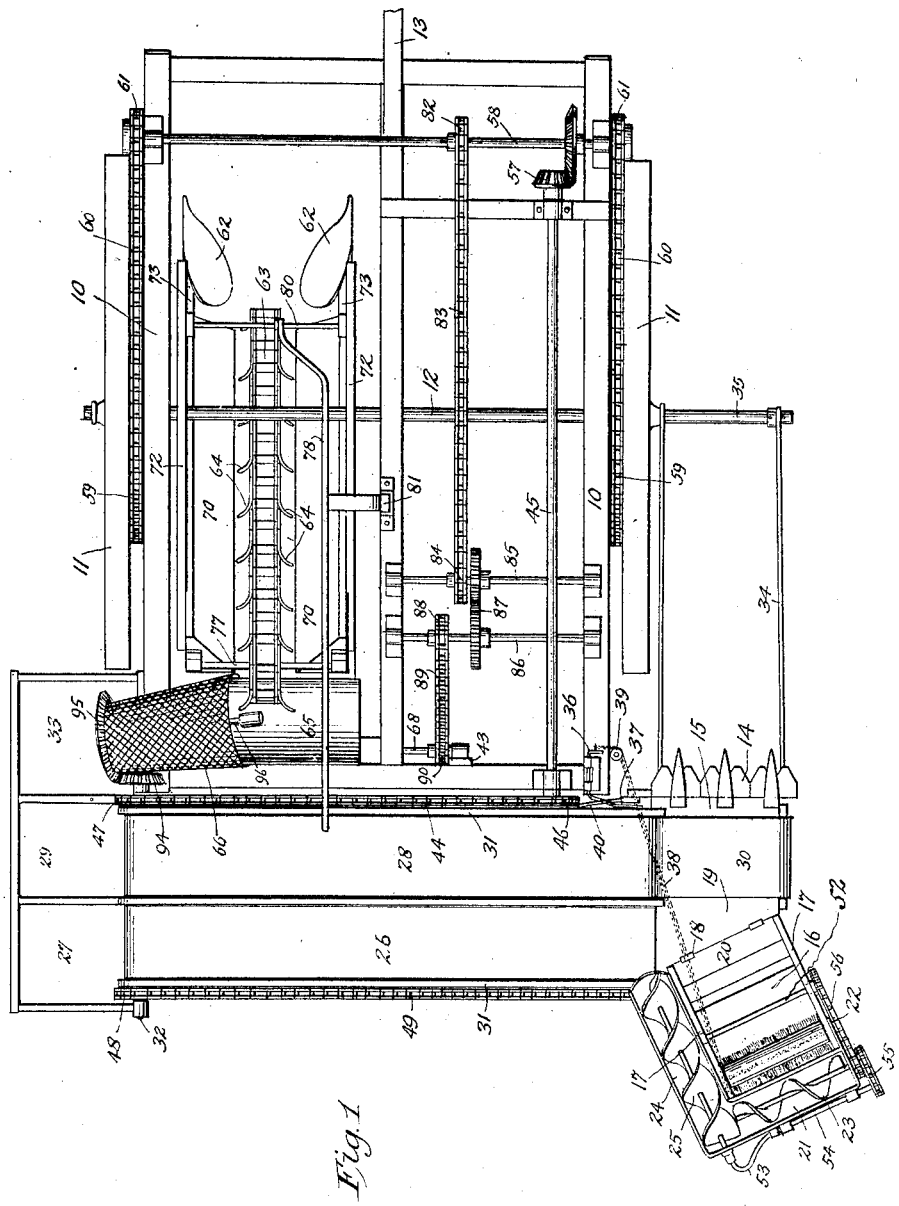
Figure 1 is a plan view of the machine.
Figure 2:
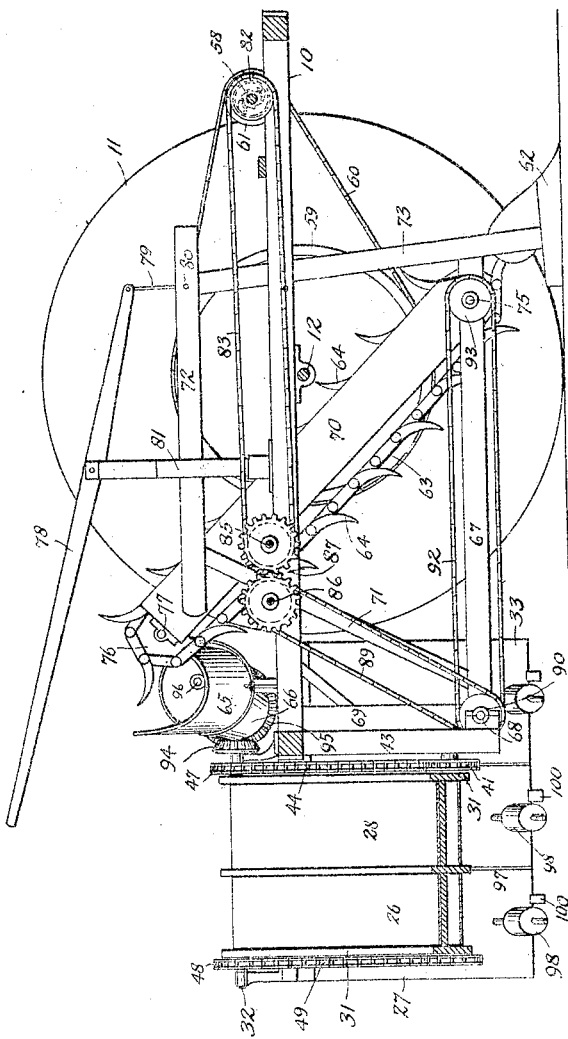
Fig. 2 is a longitudinal section thereof on the line 2—2 of Fig. 3, showing the digging and lifting mechanism.
Figure 3:
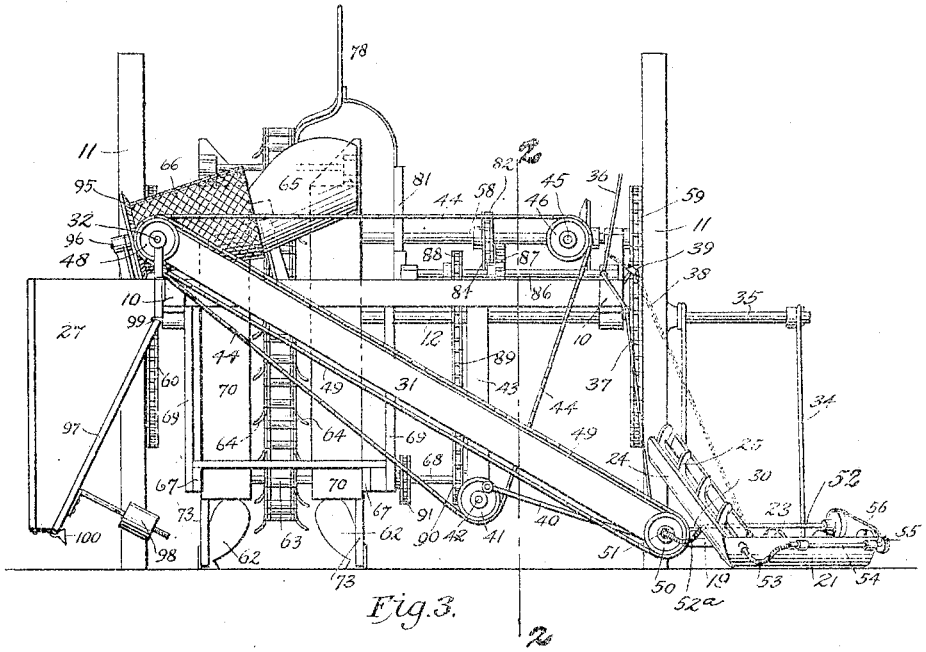
Fig. 3 is a rear end view of the machine.
Figure 4:
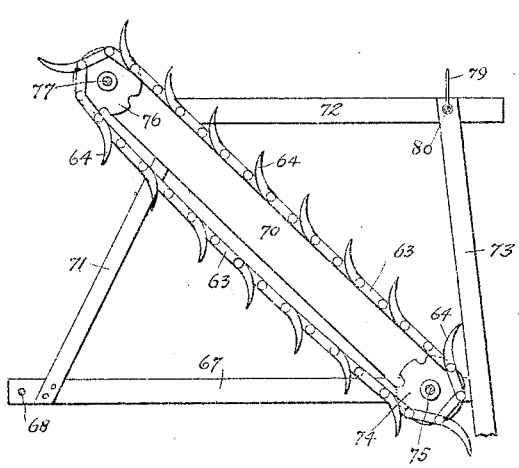
Fig. 4 is a detail showing the frame of the digging and lifting mechanism.
Figure 5:
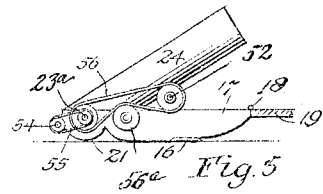
Fig. 5 is a side elevation of the topping device.
Figure 6:
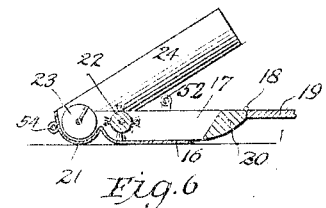
Fig. 6 is a longitudinal section of said device.

Referring specifically to the drawings, the wheeled supporting frame of the machine is constructed in any suitable manner, laterally spaced side bars 10 being shown which are connected and braced in a proper manner to produce a rigid frame. The wheels supporting the frame and driving the mechanism carried thereby, are shown at 11, they being mounted on an axle 12. A fragment of a draft pole or tongue for attachment of the draft animals is shown at 13, but it will be understood, that the machine may be motor-driven.

The machine is designed to top the beets while in the ground, and then to dig up or lift the topped beets out of the ground. The topping and digging mechanisms operate continuously and they are located in laterally spaced relation so that while one row of beets is being topped, another row of beets, already topped, is dug up or lifted out of the ground. The spacing corresponds to three rows of beets, and hence before the digging mechanism is started, two adjacent rows must have been topped, whereupon the digging mechanism starts on the first topped row while the topping mechanism starts on the third row. Of course, this spacing may be varied as desired as long as the two mechanisms are arranged to operate continuously, the digging mechanism going over the row already topped while the topping mechanism is going over another row to be subsequently gone over by the digging mechanism.

The topping mechanism will first be described in detail. This mechanism includes a cutting apparatus for removing the foliage from the plants, said mechanism comprising a reciprocatory cutter bar 14 operating in conjunction with a finger bar 15, the structure being similar to a mowing machine cutting apparatus. The foliage cutter extends outwardly from one side of the machine, and back of it is located the topping knife, the same being a flat blade 16 having its cutting edge arranged obliquely to the line of travel of the machine so as to make a draw-cut.

The topping knife 16 is carried by a frame 17 hinged, as shown at 18, to a platform 19 located behind the finger bar 15 and supporting the latter. The hinge connection is such that the frame 17 is free to rise and fall. In front of the knife 16 is a gage bar 20 designed to slide across the tops of the beets from which the foliage has been cut, to gage the depth at which the knife is to operate, the latter being set a predetermined distance lower than the gage bar. Hence it will be seen that the vertical distance between the knife and the bottom of the gage bar determines the amount sliced off the tops of the beets. The knife and the gage bar are both carried by the pivoted frame 17.

Back of the knife 16 is a top-receiving trough 21, the same being also carried by the frame 17, into which trough the beet tops are swept by a rotating brush 22 positioned back of the knife and close to the trough, the latter and the brush extending transversely of the machine.

In the trough 21 operates a screw conveyer 23 which carries the tops to the inner end of the trough. This end of the trough opens to a second trough 24 in which also works a screw conveyer 25 having an upward and forward inclination to discharge on to an endless conveyer belt 26 running in a direction to discharge the tops into a receptacle 27 carried by the rear end of the machine.

The belt 26 is located at the rear end of the machine and it is arranged transversely thereof. Alongside the belt 26 is a similar belt 28 for conveying the foliage to a receptacle or hopper 29 arranged alongside the receptacle 27. The belt 28 has its receiving end located at the inner end of the platform 19 in line with a conveyer belt 30 running on top of the platform and located back of the cutter bar 14. The foliage cut from the plants by the cutter bar 14 drops on the belt 30 and is conveyed by the latter to the belt 28 and taken up by the same and delivered into the receptacle 29.

The platform 19 is supported by the lower end of the frame 31 of the conveyer belts 26 and 28, said frame being pivotally supported at its upper end on a shaft 32 carried by a rearward extension of the frame of the machine, said extension also supporting the receptacles 27 and 29, as well as a third receptacle 33, the latter being provided for receiving the beets as will be presently described. From the outer end of the finger bar 15 a brace rod 34 extends and is connected to an outward extension 35 of the axle.

As the frame 31 is pivoted to swing in a vertical plane and it supports the entire cutting mechanism, the latter may be raised and lowered, this being done by a hand lever 36 carried by the rear end of the frame of the machine and having a connection 37 with the frame 31. In order that the frame 17 may be raised or lowered at the same time, it is connected by a cable 38 to the lever 36 so that when the latter is operated to swing the frame 31, the frame 17 is swung in the same direction. The cable 38 passes over a guide pulley 39.

The cutter bar 14 is operated by a pitman 40 connected to a wrist wheel 41 on a shaft 42 supported by a bracket 43 depending from the rear end of the frame of the machine. The wrist wheel is in the form of a sprocket wheel over which passes a drive chain 44 obtaining motion from a shaft 45 by being passed over a sprocket wheel 46 on the latter. The chain 44 also drives the conveyers 26 and 28 by passing over a sprocket wheel 47 on the shaft 32 thereof.

On the shaft 32 is also a sprocket wheel 48 connected by a chain 49 to a sprocket wheel 50 on the bottom shaft 51 of the conveyers 26 and 28. The shaft 51 drives a transverse shaft 52 on the frame 17 through a flexible shaft section 52ᵃ. Shaft 52 is belted or otherwise connected to the conveyer 23 to drive the same, and the belt 56 also passes over a pulley 56ᵃ on the shaft of the brush 22 for driving the same. The shaft 23ᵃ of conveyer 23 is belted, as shown at 55, to a shaft 54 carried by the rear end of the frame 17, and said shaft 54 has a flexible driving connection 53 with the conveyer 25. The platform conveyer 30 may be driven from the conveyer 28 in any suitable manner well known in the art. It will be understood of course, that various changes and modifications in the driving connections may be made, and belt drives may be substituted for the chain drives.

The shaft 45 receives motion through a bevel gearing 57 from a transverse main drive shaft 58 positioned at the forward end of the machine, and the shaft 58 is driven by the wheels 11, the latter being equipped with sprocket wheels 59 which are connected by chains 60 to sprocket wheels 61 on the shaft 58. The wheels 11 are loose on the axle 12. The sprocket wheels 61 have ratchet or other suitable driving connections with the shaft 58, to compensate for the difference in the speed of the wheels 11 when the machine is making a turn and one of said wheels is traveling faster than the other.

The mechanism for digging up and lifting the topped beets comprises two laterally spaced shares 62 straddling the row of beets and adapted to enter the ground a sufficient depth to dig up the beets as the machine is traveling forwardly over the row of topped beets. Close to the shares is positioned the lower receiving end of an endless lifter or conveyer chain 63 armed with prongs 64. This chain extends rearward with an upward inclination, and its discharging end terminates above a chute 65 leading to a rotatable screening drum 66 which is inclined to discharge into the receptacle 33. This receptacle therefore receives the topped beets after the dirt has been shaken off the same in their passage through the drum 66.

The beet-digging and lifting mechanism is carried by a vertically swinging frame so that it may be lowered into operative position, and elevated to clear the ground when the machine is not in operation. This frame comprises a pair of laterally spaced bottom bars 67 pivotally supported by a horizontal shaft 68 carried by hangers 69 depending from the main frame of the machine. The forward ends of the bars 67 support the lower ends of a pair of laterally spaced guards 70 between which the upper run of the chain 63 travels, these guards being inclined toward the chain so that they form a trough in which the chain runs and by which the beets are held on the latter and prevented from dropping off. The rear ends of the guards 70 are connected to the corresponding ends of the bars 67 by braces 71.

From the rear ends of the guards 70 extend forwardly a pair of laterally spaced top frame bars 72, between the forward ends of which latter, and the corresponding ends of the bars 67, extend standards 73 supporting at their lower ends the shares 62.

The sprocket wheel 74 supporting the lower or receiving end of the chain 63 is carried by a shaft 75 supported by the bars 67 and the lower ends of the guides 70. The sprocket wheel 76 supporting the upper end of the chain 63 is on a shaft 77 supported by the rear ends of the guides 70.

The means for raising and lowering the hereinbefore described supporting frame of the digger and lifting mechanism, comprise a hand lever 78 having a connection 79 with a rod 80 connecting the forward ends of the bars 72. A standard 81, rising from the frame of the machine, supports the hand lever 78.

The chain 63 and the drum 66 are driven by the following means:

On the main drive shaft 58 is a sprocket wheel 82 which is connected by a chain 83 to a sprocket wheel 84 on a countershaft 85. The shaft 85 is geared to a shaft 86 by spur gears 87, and on the shaft 86 is a sprocket wheel 88 which is connected by a chain 89 to a sprocket wheel 90 on the shaft 68. On the shaft 68 is a sprocket wheel 91 which is connected by a chain 92 to a sprocket wheel 93 on the shaft 75. The chain 63 is therefore driven from the shaft 58. The sifting drum 66 receives motion from the sprocket wheel 47, the latter having a bevel gear 94 which is in mesh with a bevel gear 95 on the shaft 96 carrying the drum. Clutches may be provided where desired, and various changes and modifications in the structural details shown may be made without a departure from the spirit and scope of the invention as claimed hereinafter.

In operation, the foliage is delivered to the receptacle 29, the tops to the receptacle 27, and the screened beets to the receptacle 33, the three products being therefore collected for separate disposal. These receptacles are adapted to be emptied automatically, which is done by providing the same with a swinging, downwardly inclined side door 97 counterweighted as shown at 98. The door is hinged at the top, as shown at 99, and its lower end is provided with an automatic latch 100 of any suitable kind adapted to snap over the door to hold it closed. When the load of the accumulating material in the receptacle becomes great enough to overbalance the door, the latter swings open and allows the material to dump, after which the door swings closed and remains in this position until another batch of material accumulates.

I claim:

1. In a beet harvester, a cutter for removing the foliage from the standing plants, a platform back of the cutter, a conveyer running above the platform to receive the foliage, a second conveyer onto which the platform conveyer discharges, a receptacle into which the second conveyer discharges, a topper operating after the removal of the foliage from the plants, a receptacle to receive the tops, and means for delivering the tops to said receptacle.

2. In a beet harvester, a cutter for removing the foliage from the standing plants, a receptacle to receive the foliage, means for delivering the foliage to said receptacle, a topper operating after the removal of the foliage from the plants, a trough back of the topper to receive the tops, a receptacle to receive the tops, a conveyer discharging into the receptacle, and means for delivering the tops from the trough to the last-mentioned conveyer.

3. In a beet harvester, a cutter for removing the foliage from the standing plants, a receptacle to receive the foliage, means for delivering the foliage to said receptacle, a topper operating after the removal of the foliage from the plants, a trough back of the topper to receive the tops, a receptacle to receive the tops, a conveyer discharging into the receptacle, and a screw conveyer working in the trough for delivering the tops from the trough to the last-mentioned conveyer.

4. In a beet harvester, a cutter for removing the foliage from the standing plants, a receptacle to receive the foliage, means for delivering the foliage to said receptacle, a topper operating after the removal of the foliage from the plants, a trough back of the topper to receive the tops, a receptacle to receive the tops, a rotary brush operating behind the topper for throwing the tops into the trough, a conveyer discharging into the receptacle, and means for delivering the tops from the trough to the last-mentioned conveyer.

5. In a beet harvester, a cutter for removing the foliage from the standing plants, a platform back of the cutter, a conveyer running above the platform to receive the foliage, a second conveyer onto which the platform conveyer discharges, a receptacle into which the second conveyer discharges, a topper operating after the removal of the foliage from the plants, a trough back of the topper to receive the tops, a receptacle to receive the tops, a conveyer discharging into the receptacle and means for delivering the tops from the trough to the last-mentioned conveyer.

6. In a beet harvester, a cutter for removing the foliage from the standing plants, a platform carrying the cutter, a frame hinged to the rear end of the platform and free to rise and fall, a topping knife carried by the frame, and a gage bar carried by the frame in front of the topping knife.

7. In a beet harvester, a cutter for removing the foliage from the standing plants, a platform carrying the cutter, a frame hinged to the rear end of the platform and free to rise and fall, a topping knife carried by the frame, a gage bar carried by the frame in front of the topping knife, a pivoted support for the platform to permit the same to be elevated and lowered, means for swinging said support, and a connection between said means and the aforesaid frame to elevate and lower the same simultaneously with the platform.

8. In a beet harvester, a cutter for removing the foliage from the standing plants, a platform carrying the cutter, a frame hinged to the rear end of the platform and free to rise and fall, a topping knife carried by the frame, a gage bar carried by the frame in front of the topping knife, a pivoted support for the platform to permit the same to be elevated and lowered, a lever for swinging said support, and a connection between the lever and the aforesaid frame to elevate and lower the same simultaneously with the platform.

9. In a beet harvester, a cutter for removing the foliage from the standing plants, a platform carrying the cutter, a conveyer running above the platform to receive the foliage, a second conveyer onto which the platform conveyer discharges, and a pivoted frame carrying the second conveyer and free to swing in a vertical plane, said frame carrying the platform.

10. In a beet harvester, a cutter for removing the foliage from the standing plants, a platform carrying the cutter, a conveyer running above the platform to receive the foliage, a second conveyer onto which the platform conveyer discharges, a pivoted frame carrying the second conveyer and free to swing in a vertical plane, said frame carrying the platform, a frame hinged to the rear end of the platform and free to rise and fall, a topping knife carried by the frame, and a gage bar carried by the frame in front of the topping knife.

11. In a beet harvester, a cutter for removing the foliage from the standing plants, a platform carrying the cutter, a conveyer running above the platform to receive the foliage, a second conveyer onto which the platform conveyer discharges, a pivoted frame carrying the second conveyer and free to swing in a vertical plane, said frame carrying the platform, a frame hinged to the rear end of the platform and free to rise and fall, a topping knife carried by the frame, a gage bar carried by the frame in front of the topping knife, means for swinging the aforesaid conveyer frame, and a connection between said means and the topping knife frame to elevate and lower the same simultaneously with the conveyer frame.

In testimony whereof I affix my signature.

FRITZ SLATHAR.